United States Patent [19]

Soeda et al.

[11] Patent Number: 5,035,591
[45] Date of Patent: Jul. 30, 1991

[54] VULCANIZING APPARATUS

[75] Inventors: Koji Soeda, Kobe; Yoshiya Kubota; Shoji Okamoto, both of Toyota; Akinori Kubota, Kobe; Michihito Kobayashi, Toyota; Masaaki Ijiri, Aichi; Susumu Ozawa, Hekinan; Kiyoshi Tomosada, Toyota; Nobuhiko Irie, Nagasaki; Akira Hasegawa, Nagasaki; Hideaki Katayama, Nagasaki; Toshifumi Murakami, Nagasaki; Katsuyoshi Sakaguchi, Nagasaki, all of Japan

[73] Assignees: Sumitomo Rubber Industries, Ltd., Kobe; Mitsubishi Jukogyo Kabushiki Kaisha, Tokyo, both of Japan

[21] Appl. No.: 444,909

[22] Filed: Dec. 4, 1989

[30] Foreign Application Priority Data

Dec. 8, 1988 [JP] Japan ................ 63-311334

[51] Int. Cl.⁵ ............................................. B29C 35/04
[52] U.S. Cl. .................................... 425/40; 435/193; 435/195; 435/383; 435/411
[58] Field of Search ............ 425/32, 40, 41, 193, 425/195, 17, 35, 384, 407, 547, DIG. 245, 11, 246, 526, DIG. 110, 411; 100/918, 38, 93 P; 249/79-81

[56] References Cited

U.S. PATENT DOCUMENTS

| | | | |
|---|---|---|---|
| 245,229 | 8/1881 | Scott | 165/142 |
| 3,948,283 | 4/1976 | Asfura et al. | 137/590 |
| 4,379,104 | 4/1983 | Koorevaar | 425/40 |
| 4,580,959 | 4/1986 | Pissorno et al. | 425/28.1 |

FOREIGN PATENT DOCUMENTS

| | | |
|---|---|---|
| 0170109 | 2/1986 | European Pat. Off. . |
| 0244286 | 11/1987 | European Pat. Off. . |
| 2613979 | 10/1988 | France . |
| 5747134 | 5/1982 | Japan . |
| 5911234 | 1/1984 | Japan . |
| 60-217114 | 10/1985 | Japan . |
| 0253514 | 12/1985 | Japan .................. 100/918 |

Primary Examiner—Willard E. Hoag
Attorney, Agent, or Firm—Armstrong, Nikaido, Marmelstein, Kubovcik & Murray

[57] ABSTRACT

A vulcanizing apparatus having penetrating passages connected and communicated with a jacket portion of a mold member. An upper open end portion of one of the penetrating passages is connected to a steam inlet pipe while an upper open end portion of the other penetrating passage is connected to a steam outlet pipe. The connections and communications of the jacket portion with the steam inlet and outlet pipes can be simultaneously and efficiently completed in a single operation. Inner tubes are slidably disposed along the penetrating passages and pressed against the connecting surface of the mold, and appropriate pressure is applied on the seal packing member on the connecting surface independent from the clamping force of the upper mold in order to ensure reliable sealing.

2 Claims, 5 Drawing Sheets

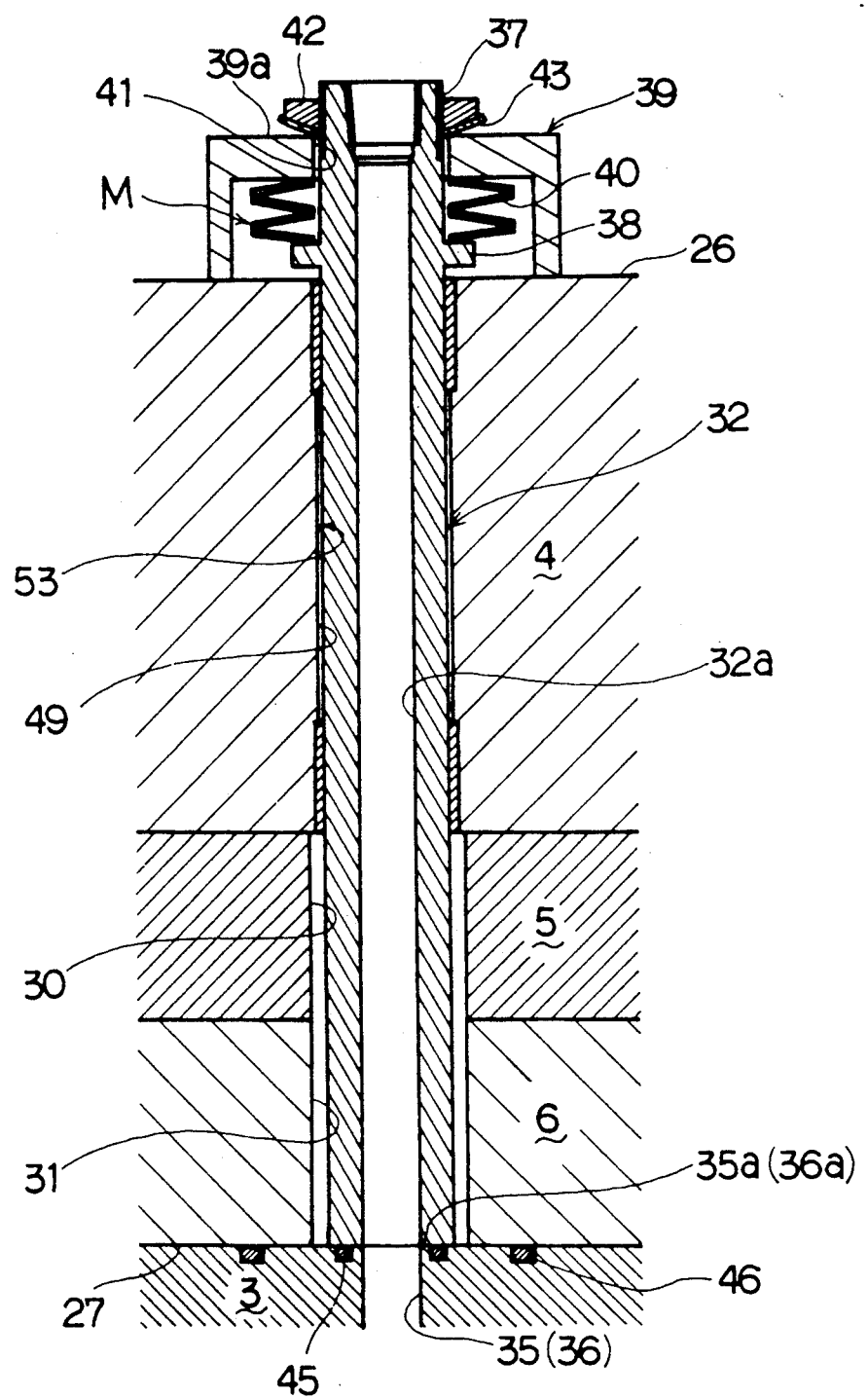
FIG.2 Ⅱ

VULCANIZING APPARATUS

BACKGROUND OF THE INVENTION

The present invention relates to a vulcanizing apparatus equipped with a mold having a jacket portion for heating, and more particularly to a tyre vulcanizing apparatus of a segmental mold type.

As shown in FIG. 7, a tyre vulcanizing apparatus of a segmental mold type generally includes, an upper platen (e) supported by a bolster (q) with an insulating member (r) disposed therebetween; an actuator (f) detachably connected to the upper platen (e) via a locking mechanism and having a jacket portion (g) for heating; a plurality of circumferentially divided sectors (c) slidably supported by the actuator (f); a tread ring (t) supported by the sectors (c); an upper mold (a) supported by an up-down mechanism which is not shown in FIG. 7; a lower platen (s); and a lower mold (b) supported by the lower platen (s). Further, provided are a steam inlet pipe (h) and a steam outlet pipe (i) communicating with the jacket portion (g) formed in the actuator (f) for the heating of the sectors (c). The steam inlet pipe (h) passes through a hole (k) and projects outwardly from a heat shield (j), and further connects with a steam supply pipe (m) via a flexible tube (l). The steam outlet pipe (i) passes through a hole (n) and projects outwardly from the heat shield (j), and further connects with a steam discharge pipe (p) via another flexible tube (o).

Thus, the change of the mold requires disconnecting and reconnecting work between the flexible tube (l) and the steam inlet pipe (h) and between the flexible tube (o) and the steam outlet pipe (i). Accordingly, the prior art apparatus has substantial problem in that the mold change requires much labor and much time. Moreover, in the prior art apparatus, the heat shield (j) must have holes (h, n) and therefore there is the problem that the shield effect is lowered.

An object of the present invention is to provide a vulcanizing apparatus wherein the mold change can be carried out easily and rapidly and the productivity can be improved.

SUMMARY OF THE INVENTION

In order to accomplish the above-mentioned objects, there is provided according to the present invention a vulcanizing apparatus equipped with an upper platen supported by a bolster and with a mold member detachably connected to the upper platen, the mold member having a jacket portion for heating, wherein a pair of penetrating passages extend from an upper surface of the bolster to a bottom surface of the upper platen. A steam inlet pipe is connected to an upper open end of a first penetrating passage of the pair of penetrating passages. A steam outlet pipe is connected to an upper open end of a second penetrating passage of the pair of penetrating passages, and, at the upper portion of the mold member, a steam supply passage is provided for communicating with the jacket portion of the mold member. The steam supply passage capable of communicates with a bottom open end of the first penetrating passage in a condition wherein the mold member is connected to the upper platen, and, at the upper portion of the mold member, a steam exhaust passage is provided for communicating with the jacket portion of the mold member, the steam exhaust passage capable of communicating with a bottom open end of the second penetrating passage in a condition wherein the mold member is connected to the upper platen, so that the steam supply passage is capable of connecting and communicating with the first penetrating passage and further with the steam inlet pipe and concurrently the steam exhaust passage is capable of connecting and communicating with the second penetrating passage and further with the steam outlet pipe. Also, vulcanizing apparatus is provided for employing the above-mentioned construction and further having an additional feature wherein inner tubes capable of sliding respectively along the first and second penetrating passages are placed respectively in the first and second penetrating passages, and the inner tubes are associated with pusher mechanisms for pressing with appropiate pressure the inner tubes respectively against the periphery of a top open end of the steam supply passage of the mold member and against the periphery of a top open end of the steam exhuast passage of the mold member.

In the vulcanizing apparatus of the present invention, when the mold member having the jacket portion is connected to the upper platen, the bottom open ends of the two penetrating passages are connected and communicated with the jacket portion and concurrently the upper open end of one penetrating passage is connected to the steam inlet pipe while the upper open end of the other penetrating passage is connected to the steam outlet pipe, and accordingly and connections and communications of the jackekt portion with the steam inlet pipe and the steam outlet pipe can be completed simultaneously in a single operation.

Further, by employing additional construction wherein the inner tubes are disposed slidably along the penetrating passages and pressed agsinst the connecting surface of the mold by means of a spring and the like, appropriate pressure is applied onto the seal packing member on the connecting surface independently from the clamping force of the upper mold, and this ensures reliable sealing.

BRIEF DESCRIPTION OF THE DRAWINGS

The features and advantages of the present invention will be more clearly appreciated from the accompanying drawings, in which:

FIG. 2I and FIG. 2II are enlarged sectional views showing different sights of a major part of another embodiment of the present invention;

DETAILED DESCRIPTION

Figure 1:
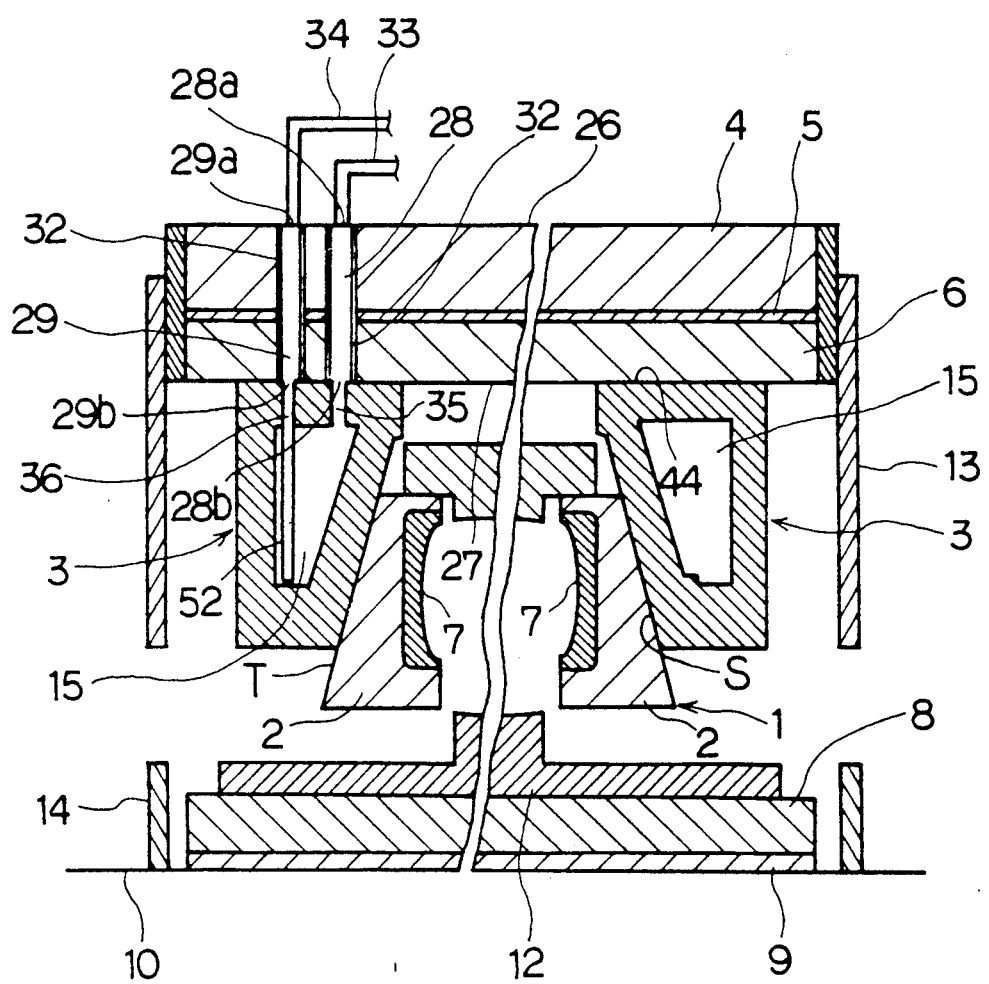
FIG. 1 is a schematic sectional view showing an embodiment of the present invention.
Figure 21:
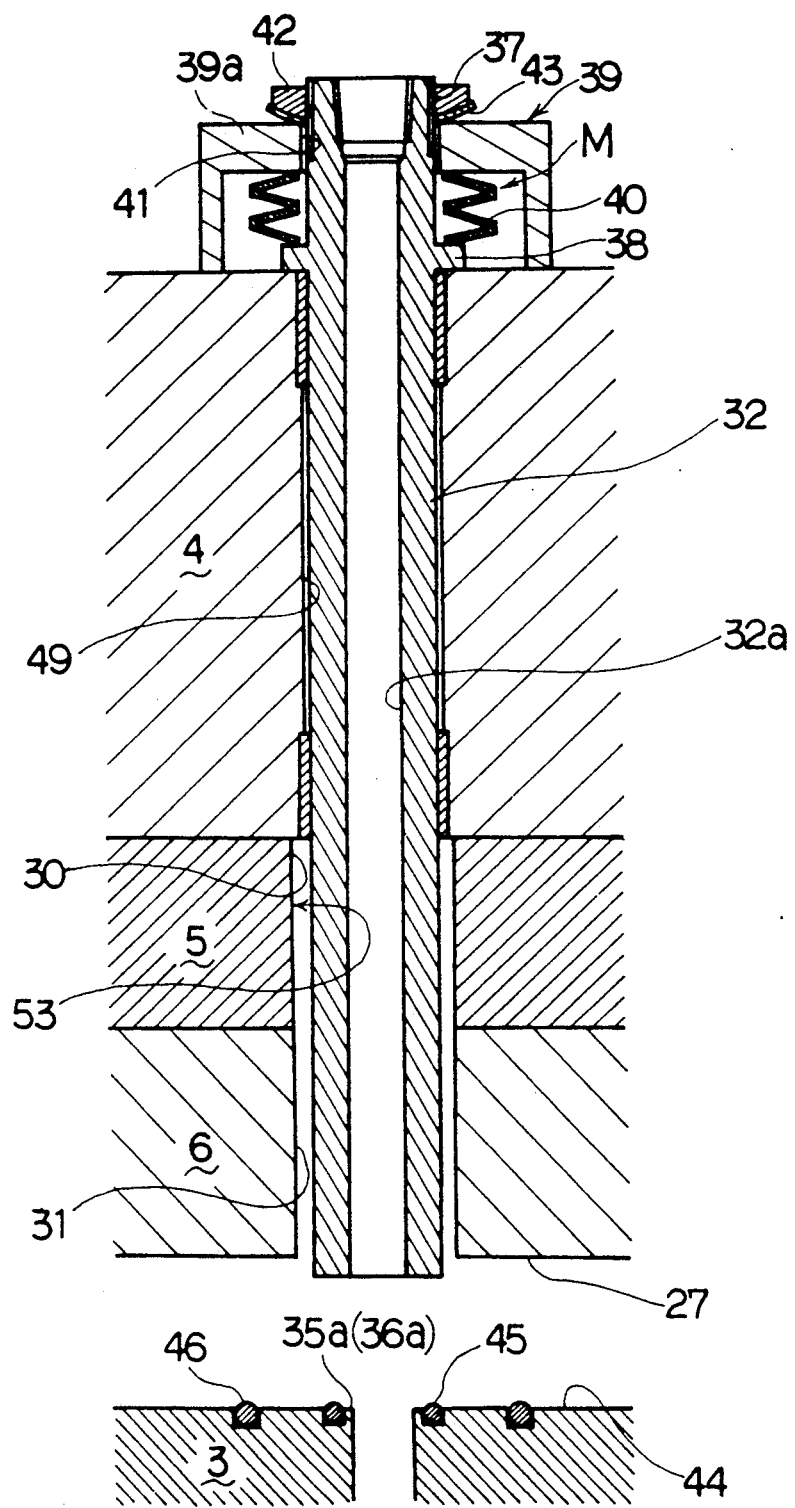

Hereinafter, specific embodiments of the present invention are explained in detail referring to the drawings.

FIG. 1 shows a tyre vulcanizing apparatus of a segmental mold type in accordance with the present invention. The apparatus comprises a bolster 4; an upper platen 6 attached to the bolster 4 with an insulating member 5 disposed therebetween; an actuator 3, which serves as a mold member, detachably connected to the upper platen 6 via a locking mechanism 16 (refer to FIG. 3) and having internally a jacket portion 15; and an upper mold 11 supported by an up-down mechanism which is not shown in the drawing. The apparatus also has a lower platen 8 supported by a base 10 with another insulating member 9 therebetween; and a lower mold 12. Further, a plurality of circumferentially divided sectors 2 are slidably supported by the actuator 3, and a tread ring 7 is supported by each sector 2. The reference numeral 1 indicates a mold which includes the actuator 3, the sectors 2, the upper mold 11 and the lower mold 12.

In the structural arrangement shown in FIG. 1, the downward or upward sliding movement of a sliding surface (S) of the actuator 3 relative to a inclined surface (T) of the sector 2 causes the inward or outward radial sliding movement of the sector 2 with tread ring 7 and simultaneously gives the downward or upwardly movement of the upper mold 11 so that the molds are closed or opened.

The sector 2 is heated by mneans of the jacket portion 15 of the actuator 3.

The numeral 13 indicates a heat shield located around the upper mold 11, sector 2 and actuater 3, and the numeral 14 indicates another heat shield located around the lower mold 12.

Figure 3:
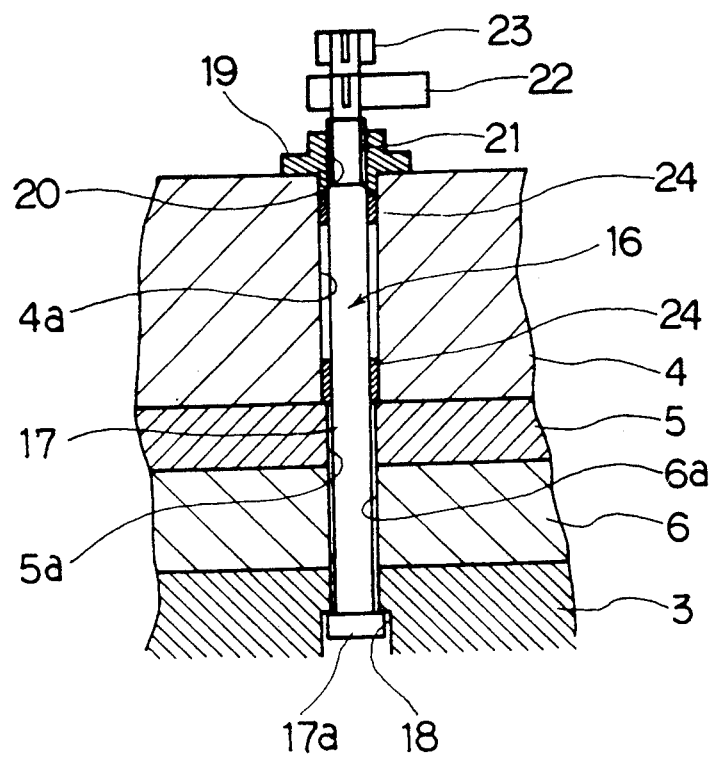
FIG. 3 is an enlarged sectional view showing a locking mechanism.

An example of the previously mentioned locking mechanism 16 used for the detachable connection between the actuator 3 (a mold member) and the upper platen 6 includes, as shown in FIG. 3, a rod 17 inserted into a hole 4a of the bolster 4, into a hole 5a of the insulating material 5 and into a hole 6a of the upper platen 6 and having an engaging portion 17a at its end, and a cylinder mechanism omitted in the drawing which rotates the rod 17 around its central axis so that the engaging portion 17a can be detachably engaged with an engaging recess 18 of the jacket portion 15.

A more detailed explanation of FIG. 3 is given hereinafter. The upper portion having a threaded portion 21 of the rod 17 projects from the bolster 4, while a flange 19 having a threaded hole 20 is fixed on the bolster, and the threaded portion 21 of the rod 17 is engaged with the female-threaded hole 20 of the flange 19. In addition, a link 22 is attached to the rod 17 at a portion slightly over the threaded portion 21 to transmit the rotational force to a plurality of such rods disposed for simultaneous rotation. The numeral 23 is a primary link which is connected to the cylinder mechanism omitted in the drawing. Through the primary link 23, rotational force is given to the rod 17 when the cylinder mechanism actuates. Thus, the rod 17 is rotated by the cylindrical mechanism, and the rotation causes the up-down movement of the rod 17 according to the pitch of the thread. The numeral 24 indicates each guide bush which is inserted into the hole 4a of the bolster to facilitate the sliding movement of the rod 17.

The engaging portion 17a of the rod 17 has a shape in a plan view similar to a circle with both sides being cut away by a pair of parallel lines. The rotation of the rod 17 selectively provides a state as shown in FIG. 4II wherein each flange-like portion having a round periphery catches an engaging surface 25 in the engaging recess 18, or alternatively another state as shown in FIG. 4I wherein the flange-like portion does not catch the engaging surface 25.

Figure 4:
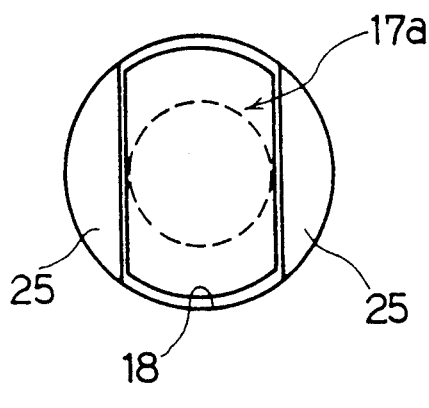
FIG. 4I and FIG. 4II are enlarged bottom views showing different sights of a locking mechanism.
Figure 4:
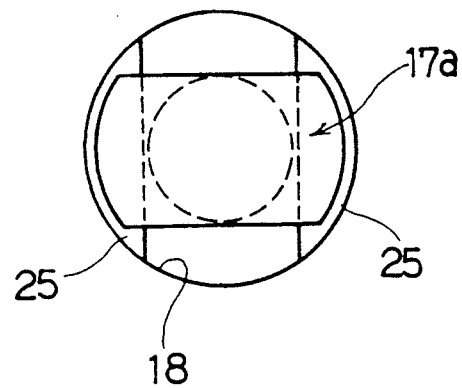

Therefore, from the state shown in FIG. 4I, when the rod 17 is rotated in an appropriate direction by an angle of 90 degrees by means of the cylinder mechanism, the rod 17 is moved upwardly according to the thread pitch and completes a locking with the actuator 3 being pressed against the upper platen 6. Then, from the locked state (the state shown in FIG. 4II), when the rod 17 is rotated in the opposite direction as discused above, an unlocking is performed.

Again, with reference to FIG. 1, there is formed a pair of penetrating passages 28, 29 extending from an upper sufrace 26 of the bolster 4 to a bottom surface 27 of the upper platen; a steam inlet pipe 33 is connected to an upper open end 28a of the first penetrating passage 28; and a steam outlet pipe 34 is connected to an upper open end 29a of the second penetrating passage 29. Further, there are respectively formed at the upper portion of the actuator 3 a steam supply passage 35 communicating with the jacket portion 15 and a steam exhaust passage 36 communicating with the jacket portion 15, so that the bottom open end 28b of the first penetrating passage 28 is brought into connection with the steam supply passage 35 while the bottom open end 29b of the second penetrating passage 29 is brought into connection with the steam exhaust passage 36 in a condition wherein the actuator 3 is brought into contact and connection with the upper platen 6. Consequently, steam from the steam inlet pipe 33 is introduced into the jacket portion 15 of the actuator 3 through the first penetrating passage 28, and discharge from the jacket portion is through the second penetrating passage 29 to the steam outlet pipe 34. The steam inlet pipe 33 and the first penetrating passage 28, as well as the steam outlet pipe 34 and the second penetrating passage 29, are connected by means of screw joints or the like.

In another embodiment as shown in FIG. 2I and FIG. 2II, there is formed two bores 53, 53 (i.e. the first penetrating passages 28 and the second penetrating passage 29) respectively comprising holes 49, 49 of the bolster 4, holes 30, 30 of the insulation member 5 and holes 31, 31 of the upper platen 6, and into the bores 53, 53, inner tubes 32, 32 are inserted and placed, as explained below.

The inner tubes 32, 32 are slidably placed in the bore 53, 53 each comprising holes 49, 30 and 31. Each inner tube 32 has a threaded portion 37 at its upper end portion, and below the threaded portion 37, has an outer flange portion 38 having a larger diameter than the hole 49. On the upper surface of the bolster 4, a pusher mechanism (M) for pressing downwardly each inner tube 32 is provided. The pusher mechanism (M) comprises an elastic spring member 40, such as coned disc spring, as indicated in FIG. 2I and FIG. 2II and a holder 39 for housing the elastic spring member 40. The elastic spring member 40 is disposed between the lower surface of a top wall 39a of the holder 39 and the upper surface of the outer flange portion 38, and always presses the inner tube 32 downwardly. The numeral 42 indicates a nut engaged with the threaded portion 37 of the inner tube 32 which projects upwardly from the top wall 39a of the holder 39 through an opening 41, and the numeral 43 indicates a detent washer.

Thus, in a condition wherein the actuator 3 is not connected to the upper platen 6, as shown in FIG. 2I, the inner tube 32 is pressed and moved downwardly by the elastic spring member 40, and the outer flange portion 38 abuts against the circumference of the upper open end of the penatrating passage 28 or 29 (the bore 53) with the lower end of the inner tube 32 projecting from the bottom surface 27 of the upper platen 6. In the other condition, wherein the actuater 3 is connected to the upper platen 6 by means of the locking mechanism 16, as shown in FIG. 2II, the lower end of the inner tube 32 is brought into contact with and pressed on the upper surface 44 of the actuator 3. Therefore, internal bores 32a, 32a of the inner tubes 32, 32 are respectively brought into communication with the stream supply passage 35 and the steam exhaust passage 36 with sufficient sealing formed independently from the clamping force which is applied to the platen of the upper mold by the clamping mechanism. That is, one inner tube 32 is pressed on the circumference 35a of the upper open end of the steam supply passage 35, while the other inner tube 32 is pressed on the circumference 36a of the upper open end of the steam exhaust passage 36, respectively, with appropriate pressure.

The term "appropreate pressure" means pressure which provides communication and connection between the first penetrating passage 28 with the steam inlet pipe 33 and the steam supply passage 35, and communication and connection between the second penetrating passage 29 with the steam outlet pipe 34 and the steam exhaust passage 36, respectively, with sufficient sealing being formed. In FIG. 2I and FIG. 2II, the reference numeral 45 indicates the first seal ring, such as an O-ring, disposed between the lower edge of the inner pipe 32 and the upper surface 44 of the actuator 3, and the reference numeral 46 indicates the second seal ring, such as an O-ring, disposed outside of the first seal ring 45 and between the bottom surface 27 of the upper platen 6 and the upper surface 44 of the actuator 3. In addition, the reference numeral 52 in FIG. 1 indicates a pipe disposed in the jacket portion 15 so that it communicates and connects with the steam exhaust passage 36 and extends to the bottom region of the jacket portion 15.

Thus, in the vulcanizing apparatus employing the above-mentioned construction, unlike the prior art apparatus, connecting work for the steam inlet and outlet pipes and the jacket portion can be easily and rapidly carried out in the operation of changing the mold 1 without disconnecting and reconnecting the steam inlet pipe and the steam outlet pipe.

In a condition wherein the mold is closed, the heat shield 13 of the upper mold 11 and the heat shield 14 of the lower mold 12 contact each other and form a continuous heat shield.

Figure 5:
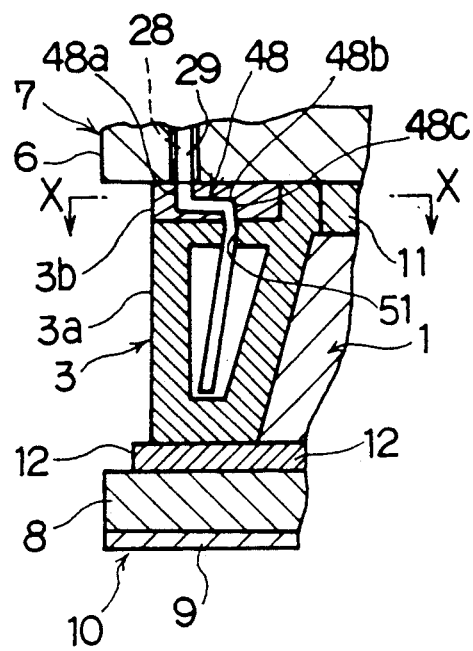
FIG. 5 is a schematic sectional view showing a major part of a different embodiment of the present invention.
Figure 6:
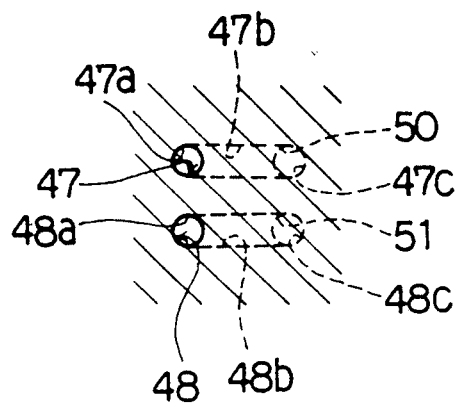
FIG. 6 is an enlarged sectional view taken along the line X—X of FIG. 5.
Figure 7:
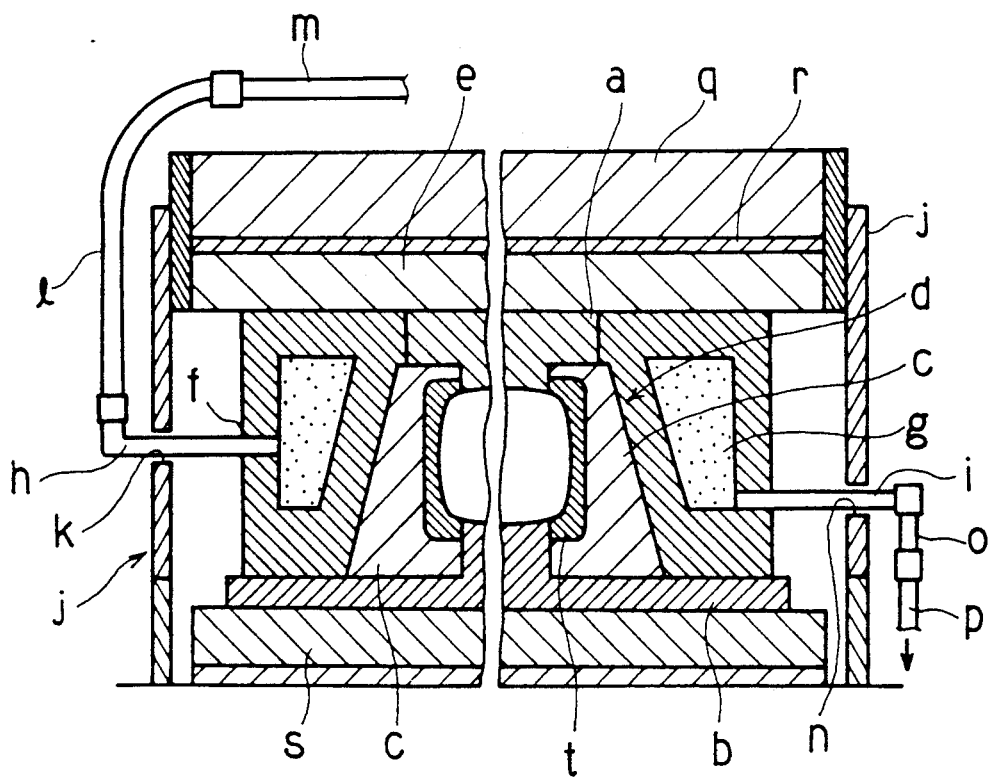
FIG. 7 is a schematic sectional view showing a prior art apparatus.

Next, a different embodiment as shown in FIG. 5, is hereinafter explained. In this embodiment, an actuator 3 includes a main body member 3a and a sub member 3b. As shown in FIG. 6 illustrating the sectional view of the sub-member 3b taken along the line X—X of FIG. 5, the sub-member 3b has a pair of crank-shaped connecting passages 47, 48. Correspondingly thereto, the main body member 3a has a pair of passages 50, 51 capable of connecting and communicating respectively with the connecting passages, 47, 48. Thus, the connecting passage 47 and the passage 50 form a steam supply passage 35 and the connecting passage 48 and the passage 51 form a steam exhaust passage 36. That is, the connecting passages 47, 48 respectively comprise upper vertical portions 47a, 48a, horizontal portions 47b, 48b respectively extending from the bottom ends of the upper vertical portions 47a, 48a inwardly in radial direction, and lower vertical portions 47c, 48c extending from the inner ends of the horizontal portions 47b, 48b downwardly in vertical direction. The lower vertical portions 47c, 48c are brought into contact and communication respectively with the passage 50, 51. The upper vertical portions 47a, 48a are brought into contact and communication respectively with penetrating passages 28, 29 formed in a bolster 4 and also coaxially in an upper platen 6. Thus, in a condition wherein the actuator 3 is attached to the upper platen 6, the bottom open ends 28b, 29b of the penetrating passages 28, 29 are brought into contact and communication respectively with the upper vertical portions 47a, 48a, and therefore, the penetrating passages 28, 29 are brought into communication with jacket portion 15.

The sub-member 3b serves as an adaptor. That is, the arrangement of the penetrating passages 28, 29 (or the inner tubes 32, 32) are in compliance with a mold having the largest size, although a smaller size mold has a smaller actuator 3 having a smaller diameter. Cosnsequently, in case a smaller size mold is used in replacement of a larger size mold, the locations of the steam supply passage 35 and the steam exhaust passage 36 of the actuator 3 deviate radially inwardly relative to the location of the penetrating passages 28, 29 (or the inner tubes 32, 32) formed in the bolster 4 and in the upper platen. The sub-member 3b employed in order to cope with this matter.

It should be noted that the present invention is not limited to the specific afore-mentioned embodiments, and further modification, for example an employment of a cylinder mechanism in replacement of the elastic spring member 4 as the pusher mechanism (M) for elastically pressing down the inner tubes 32, 32, can be freely made without departing from the spirit or scope of the present invention.

The apparatus of the present invention has the construction described hereinbefore and brings the following advantage and benefits.

A vulcanizing apparatus of the present invention has a construction wherein there is formed a pair of penetrating passages 28, 29 extending from an upper surface 26 of the bolter to a bottom surface 27 of the upper platen 6; a steam inlet pipe 33 is connected to an upper open end 28a of a first penetrating passage 28 of the pair of penetrating passagaes; a steam outlet pipe 34 is connected to an upper open end 29a of a second penetrating passage 29 of the pair of penetrating passages. At an upper portion of the mold member 3, a steam supply passage 35 is provided for communicating with the jacket portion 15 of the mold member 3. The steam supply passage 35 is capable of communicating with a bottom open end 28b of the first penetrating passage 28 in a condition wherein the mold member 3 is connected to the upper platen 6, and there is formed at another upper portion of the mold member 3 a steam exhaust passage 36 communicating with the jacket portion 15 of the mold member 3. The steam exhaust passage 36 is capable of communicating with a bottom open end 29b of the second penetrating passage 29 in a condition wherein the mold member 3 is connected to the upper platen 6, so that the steam supply passage 35 is capable of connecting and communicating with the first penetrating passage 28 and further with the steam inlet pipe 33. Concurrently, the steam exhaust passage 34 is capable of connecting and communicating with the second penetrating passage 29 and further with the steam outlet pipe 34. In this apparatus, simply by attaching the mold member (actuator) 3 to the upper platen 6, the steam inlet pipe 33 is brought into connection and communucation with the jacket portion 15 through the first penetrating passage 28 and concurrently the steam outlet pipe 34 is brought into connection and communication with the jacket portion 15 through the second penetrating passage 29. Accordingly, the laborious work of disconnecting and reconnecting the steam inlet and outlet pipes is eliminated in the operation of the mold change. As a result, required time for the operation of changing the mold is sharply reduced and considerable inmrovement in the productivity can be accomplished. Further, unlike the prior art apparatus, it is no longer necessary to make a pipe penetrate through the heat shield and consequently, it is not necessary to provide another shield for such a penetration region and the structure of the heat shield can be simplified.

Another vulcanizing apparatus of the present invention employs the above-mentioned construction and further has an additional feature wherein inner tubes 32, 32 capable of sliding respectively along the first and second penetrating passages 28, 29 are placed respectively in the first and second penetrating passages 28, 29 and the inner tubes 32, 32 are associated with a pusher mechanisms (M, M) for pressing with appropiate pressure the inner tubes 32, 32 respectively against a periphery 35a of a top open end of the steam supply passage 35 of the mold member 3 and against a periphary 36a of a top open end of the steam exhaust passage 36 of the mold member 3. The latter apparatus also provides the same advantageous effect as the former, because in this apparatus, simply by attaching the mold member (actuator) 3 to the upper platen 6, the steam inlet pipe 33 is brought into connection and comminucation with the jacket portion 15 through the first penetrating passage 28 and concurrently, the steam outlet pipe 34 is brought into connection and communication with the jacket portion 15 through the second penetrating passage 29. Further, the latter apparatus advantageously ensures more reliable connection and communication.

While the invention has been particularly shown and described in reference to preferred embodiments thereof, it will be understood by those skilled in the art that changes in form and details may be made therein without departing from the spirit and scope of the invention.

What we claim is:

1. A vulcanizing apparatus comprising:
    a bolster having an upper surface and a bottom surface;
    an upper platen having an upper surface and a bottom surface;
    an insulating member between said bottom surface of said bolster and said upper surface of said upper platen;
    means for fixing together said bolster, said insulating member and said upper platen;
    a first penetrating passage and a second penetrating passage extending form said upper surface of said bolster to said bottom surface of said upper platen;
    a mold member having a jacket portion for heating;
    a locking mechanism by which said mold member is removably coupled to said upper platen;
    a steam inlet pipe coupled to an upper open end of said first penetrating passage;
    a steam outlet pipe coupled to an upper open end of said seocnd penetrating passage;
    a steam supply passage formed at an upper portion of said mold member communicating with said jacket portion of said mold member, wherein said steam supply passage communicates with a bottom open end of said first penetrating passage;
    a steam exhaust passage formed at said upper portion of said mold member communication with said jacket portion of said mold member, wherein said steam exhaust passage communicates with a bottom open end of said second penetrating passage;
    inner tubes which respectively are longer than said first and second penetrating passages and slide internally along said first and second penetrating passages; and
    pusher means for respectively pressing with appropriate pressure said inner tubes against a periphery of a top open end of said steam supply passage of said mold member, and against a periphery of a top open end of said steam exhaust passage of said mold member.

2. A vulcanizing apparatus as in claim 1, wherein penetrating holes are formed respectively in said bolster, in said insulating member, in said upper platen and in said upper portion of said mold member, and an engaging recess is formed at a bottom end of said hole of said upper portion of said mold member, wherein said locking mechanism includes a rod inserted into said holes, and an engaging portion capable of detachably engaging with said engaging recess is formed at a bottom end of said rod.

* * * * *